US012653736B2

(12) United States Patent
Thota et al.

(10) Patent No.: US 12,653,736 B2
(45) Date of Patent: Jun. 16, 2026

(54) METHOD FOR CONTROLLING A PATIENT SUPPORT APPARATUS

(71) Applicant: Stryker Corporation, Kalamazoo, MI (US)

(72) Inventors: Madhu Sandeep Thota, Portage, MI (US); Anish Paul, Kalamazoo, MI (US)

(73) Assignee: Stryker Corporation, Portage, MI (US)

(*) Notice: Subject to any disclaimer, the term of this patent is extended or adjusted under 35 U.S.C. 154(b) by 255 days.

(21) Appl. No.: 18/564,156

(22) PCT Filed: May 27, 2021

(86) PCT No.: PCT/US2021/034649
§ 371 (c)(1),
(2) Date: Nov. 27, 2023

(87) PCT Pub. No.: WO2022/250680
PCT Pub. Date: Dec. 1, 2022

(65) Prior Publication Data
US 2024/0269023 A1 Aug. 15, 2024

(51) Int. Cl.
*A61G 7/015* (2006.01)
*A61G 7/012* (2006.01)
*A61G 7/018* (2006.01)

(52) U.S. Cl.
CPC ............. *A61G 7/015* (2013.01); *A61G 7/012* (2013.01); *A61G 7/018* (2013.01)

(58) Field of Classification Search
CPC ........ A61G 7/015; A61G 7/012; A61G 13/06; A61G 13/08; A61G 7/16
See application file for complete search history.

(56) References Cited

U.S. PATENT DOCUMENTS

| | | | | |
|---|---|---|---|---|
| 6,357,065 | B1 * | 3/2002 | Adams .................. | A61G 7/005 5/617 |
| 6,715,784 | B2 | 4/2004 | Koerlin et al. | |
| 7,058,999 | B2 | 6/2006 | Horitani et al. | |
| 9,259,369 | B2 | 2/2016 | Derenne et al. | |
| 9,301,895 | B2 | 4/2016 | Hough et al. | |
| 9,782,005 | B2 | 10/2017 | Paul et al. | |
| 10,080,438 | B2 | 9/2018 | Paul et al. | |
| 10,206,834 | B2 | 2/2019 | Furman et al. | |
| 10,260,933 | B2 | 4/2019 | Kostic et al. | |
| 10,322,044 | B2 | 6/2019 | Upchurch et al. | |
| 10,437,348 | B2 | 10/2019 | Hayes et al. | |
| 10,595,637 | B2 | 3/2020 | Paul et al. | |

(Continued)

OTHER PUBLICATIONS

International Search Report for Application No. PCT/US2021/034649 dated Aug. 25, 2021, 1 page.

*Primary Examiner* — Eric J Kurilla
(74) *Attorney, Agent, or Firm* — Howard & Howard Attorneys PLLC

(57) ABSTRACT

Systems, methods, and techniques for operating a patient support apparatus are disclosed herein. The patient support apparatus includes a support structure including a base and a patient support surface to support a patient. The patient support apparatus also includes actuators operable to move the patient support surface relative to a floor surface. The patient support apparatus is adjustable between a first support configuration and a second support configuration by operating the actuators.

20 Claims, 11 Drawing Sheets

(56) References Cited

U.S. PATENT DOCUMENTS

| | | | | |
|---|---|---|---|---|
| 10,617,327 | B2 | 4/2020 | Kostic et al. | |
| 10,687,999 | B2 | 6/2020 | Furman et al. | |
| 10,945,902 | B2 | 3/2021 | Paul et al. | |
| 11,020,295 | B2 | 6/2021 | Schaaf et al. | |
| 11,020,297 | B2 | 6/2021 | Tessmer et al. | |
| 11,116,680 | B2 | 9/2021 | Derenne et al. | |
| 2007/0157385 | A1 | 7/2007 | Lemire et al. | |
| 2007/0294828 | A1 * | 12/2007 | Hornbach ............ | A61G 7/0514 5/618 |
| 2010/0000017 | A1 * | 1/2010 | Laloge ................... | A61G 7/005 5/611 |
| 2011/0030142 | A1 * | 2/2011 | Karwal ................ | A61G 7/0507 5/608 |
| 2017/0135492 | A1 * | 5/2017 | Biancofiore ......... | A47C 21/006 |
| 2017/0172827 | A1 | 6/2017 | Schaaf et al. | |
| 2017/0172829 | A1 | 6/2017 | Tessmer et al. | |
| 2018/0055705 | A1 * | 3/2018 | Sineath, Jr. .......... | A61G 7/1007 |
| 2019/0083337 | A1 | 3/2019 | Tessmer et al. | |
| 2019/0142667 | A1 * | 5/2019 | Paul ....................... | A61G 7/015 5/600 |
| 2021/0330526 | A1 * | 10/2021 | Kennedy .............. | A61G 7/0503 |

* cited by examiner

METHOD FOR CONTROLLING A PATIENT SUPPORT APPARATUS

BACKGROUND

Patient support apparatuses, such as hospital beds, stretchers, cots, tables, wheelchairs, and chairs are used to help caregivers facilitate care of patients in a health care setting. Conventional patient support apparatuses comprise a base, a support frame, a patient support deck operatively attached to the support frame, a lift assembly for lifting and lowering the support frame relative to the base, and actuators arranged to move sections of the patient support deck relative to the support frame.

Certain conventional patient support apparatuses, such as those realized as hospital beds, are primarily employed to provide support to a patient lying on the patient support deck. To this end, one or more sections of the patient support deck provide support to the patient's head, torso, legs, and feet, allowing the patient to lay on their side, on their back in a supine position, and the like. In addition, one or more sections of the patient support deck can typically be moved or oriented relative to one another to promote patient comfort and to help facilitate patient mobility. By way of example, the patient support deck may be movable into a fowler's position to allow the patient to lay upright.

Actuators are commonly used on a patient support apparatus for various purposes. For example, the patient support apparatus may be equipped with a lift assembly that uses actuators to lift a patient resting on a patient support surface to a desired height. Another example of is an actuator used to manipulate angular positioning of portions of the patient support surface, such as the fowler, etc.

While conventional patient support apparatuses have generally performed well for their intended purpose, there remains a need in the art for a patient support apparatus that overcomes the disadvantages in the prior art while, at the same time, contributing to improved patient mobility, safety, and ambulation.

SUMMARY

The present disclosure provides a method for adjusting a patient support surface of a patient support apparatus from a first support configuration to a second support configuration, the patient support apparatus having first, second, third, and fourth support actuators each being operable to move the patient support surface relative to a floor surface and each being adjustable between respective minimum and maximum actuator positions. The method comprises simultaneously operating the first, second, third, and fourth support actuators to move the patient support surface toward the second support configuration. The method further comprises interrupting operation of the second support actuator at a predetermined target second actuator position to stop movement of the second support actuator while continuing operation of the first, third, and fourth support actuators. Further comprising simultaneously interrupting operation of the first, third, and fourth support actuators at respective predetermined target first, third, and fourth actuator positions to place the patient support surface in the second support configuration.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
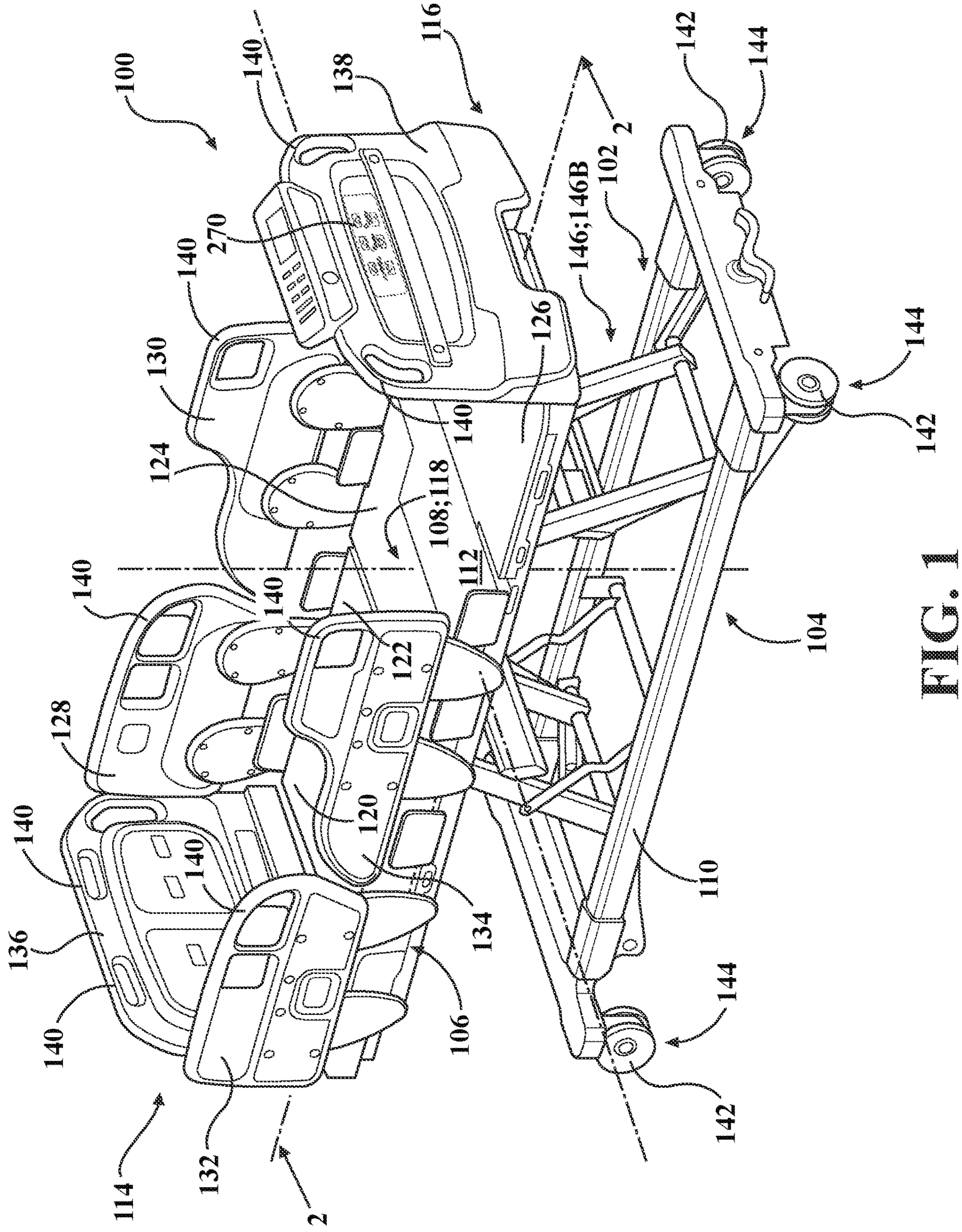
FIG. 1 is a perspective view of a patient support apparatus having a base, an intermediate frame supporting a patient support surface, and actuators.

Referring to FIG. 1, an exemplary patient support apparatus 100 is shown for supporting a patient in a health care setting. The patient support apparatus 100 illustrated in FIG. 1 comprises a hospital bed. In other versions, however, the patient support apparatus 100 may comprise a stretcher, cot, table, wheelchair, or similar apparatus utilized in the care of a patient.

A support structure 102 provides support for the patient. The support structure 102 illustrated in FIG. 1 comprises a base 104 movable about a floor surface F, an intermediate frame 106, and a patient support deck 108. The base 104 may comprise a base frame 110. The patient support deck 108 may be disposed on the intermediate frame 106. The intermediate frame 106 and the patient support deck 108 are spaced above the base 104 in FIG. 1. The patient support deck 108 provides a patient support surface 112 upon which the patient is supported.

A mattress (not shown) may be disposed on the patient support deck 108 during use. The mattress comprises a secondary patient support surface upon which the patient is supported. The base 104, support frame 106, patient support deck 108, and patient support surfaces 112 each have a head-end 114 and a foot-end 116 corresponding to designated placement of the patient's head and feet on the patient support apparatus 100. The construction of the support structure 102 may take on any suitable design and is not limited to that specifically set forth above. In addition, the mattress may be omitted in certain versions, such that the patient rests directly on the patient support surface 112.

As will be discussed in greater detail below, the patient support deck 108 has at least one deck section 118 arranged for movement relative to the intermediate frame 106 to support the patient in different positions, orientations, and the like. The deck sections 118 of the patient support deck 108 provide the patient support surface 112 upon which the patient is supported. More specifically, in the representative version of the patient support apparatus 100 illustrated in FIG. 1, the patient support deck 108 has four deck sections 118, which cooperate to define the patient support surface 112: a fowler section 120 (or back section), a seat section 122, a leg section 124, and a foot section 126. Here, the seat section 122 is fixed to the intermediate frame 106 and is not arranged for movement relative thereto. However, it will be appreciated that the seat section 122 could be movable relative to other deck sections 118 in some versions. Conversely, the fowler section 120 and the leg section 124 are arranged for movement relative to each other and to the intermediate frame 106, as described in greater detail below, and the foot section 126 is arranged to move partially concurrently with the leg section 124. Other configurations and arrangements are contemplated.

Side rails 128, 130, 132, 134 are coupled to the intermediate frame 106 and are thereby supported by the base 1104. A first side rail 128 is positioned at a right head end of the intermediate frame 106. A second side rail 130 is positioned at a right foot end of the intermediate frame 106. A third side rail 132 is positioned at a left head end of the intermediate frame 106. A fourth side rail 134 is positioned at a left foot end of the intermediate frame 106. If the patient support apparatus 100 is a stretcher or a cot, there may be fewer side rails. The side rails 128, 130, 132, 134 are movable to a raised position in which they block ingress and egress into and out of the patient support apparatus 100, one or more intermediate positions, and a lowered position in which they are not an obstacle to such ingress and egress. In still other configurations, the patient support apparatus 100 may not include any side rails. The Applicant has described versions of patient support apparatuses having side rails equipped with actuators for "motorized" movement in United States Patent Application Publication No. US 2017/0172829 A1, the disclosure of which is hereby incorporated by reference in its entirety. Other configurations are contemplated.

Figure 2:
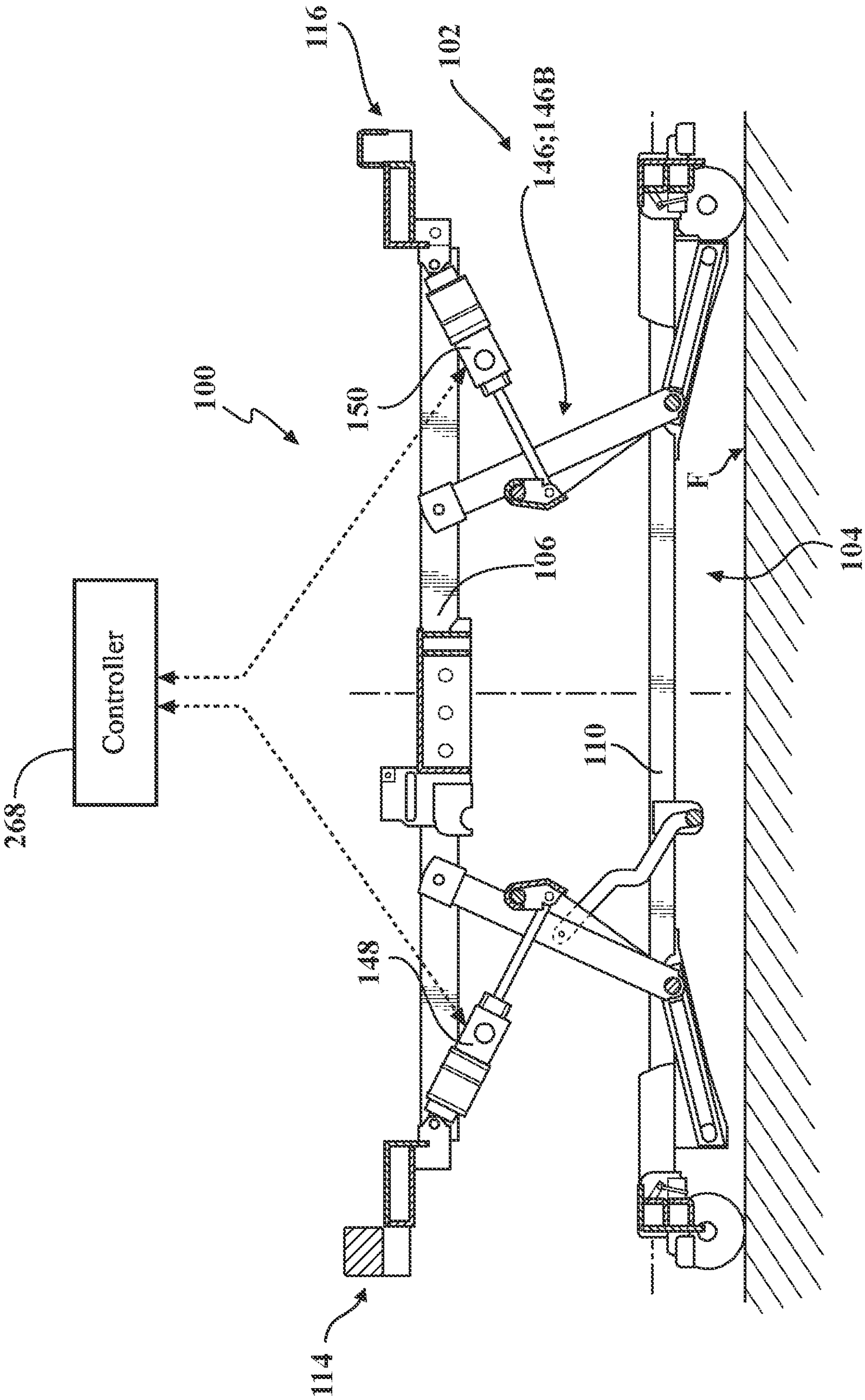
FIG. 2 is a cross-sectional view of the base and intermediate frame of the patient support apparatus of FIG. 1 taken along line 2-2.
Figure 3:
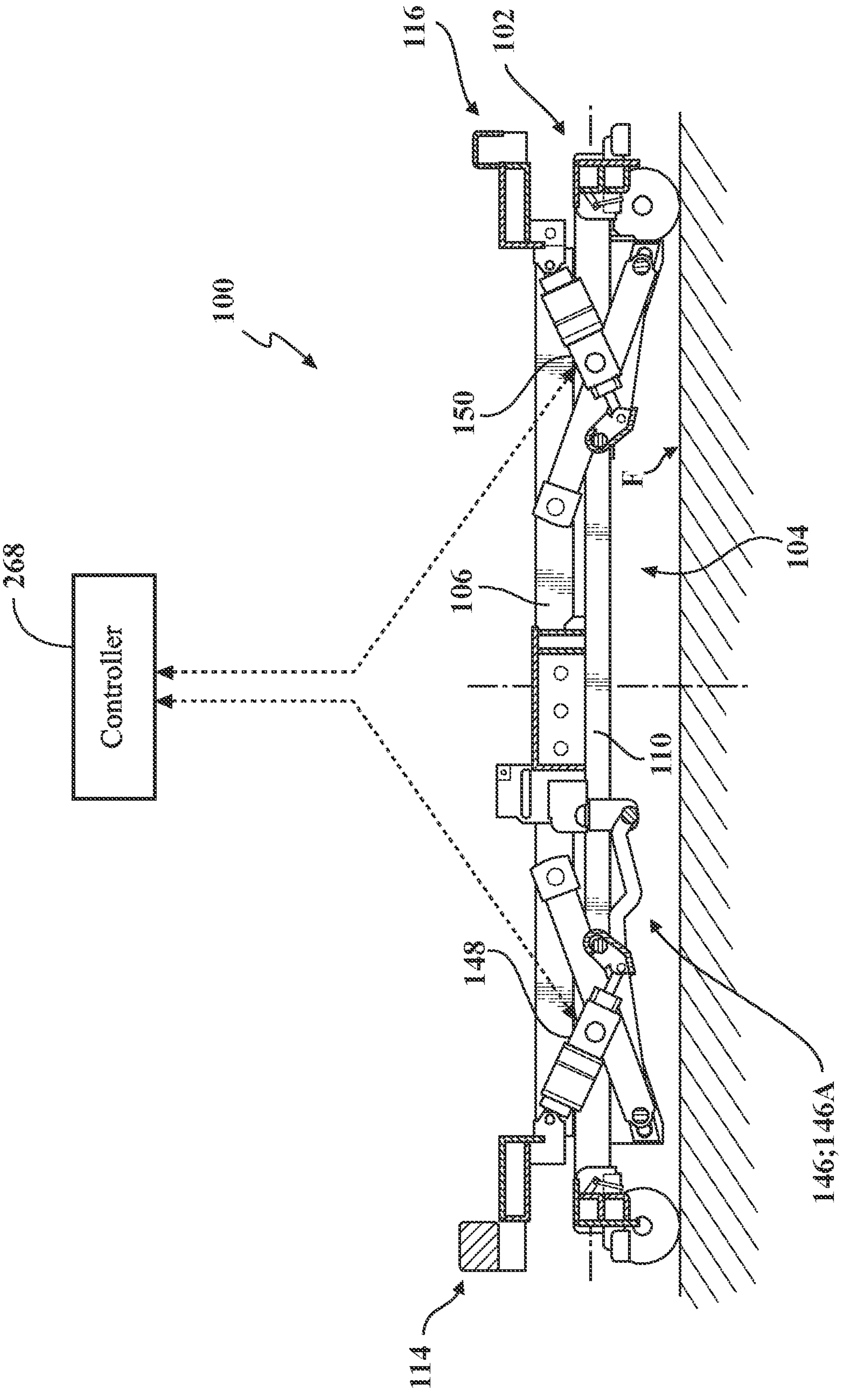
FIG. 3 is a cross-sectional view of the patient support apparatus of FIG. 2, shown with the intermediate frame at a lowered position relative to the base.

The side rails 128, 130, 132, 134 could be of any suitable type, arrangement, or configuration sufficient to selectively limit patient ingress/egress from the patient support apparatus 100. It will be appreciated that there may be fewer side rails for certain versions, such as where the patient support apparatus 100 is realized as a stretcher or a cot. Moreover, it will be appreciated that in certain configurations, the patient support apparatus 100 may not include any side rails. Similarly, it will be appreciated that side rails may be attached to any suitable component or structure of the patient support apparatus 100. Furthermore, in certain versions the side rails are coupled to one of the deck sections 40 for concurrent movement. In FIGS. 2-3, which each depict right-side views of the patient support apparatus 100, the side rails are omitted for clarity.

A headboard 136 and a footboard 138 may be coupled to the intermediate frame 106. In other versions, when the headboard 136 and footboard 138 are included, the headboard 136 and footboard 138 may be coupled to other locations on the patient support apparatus 100, such as the base 104. In still other versions, the patient support apparatus 100 may not include the headboard 136 and/or the footboard 138.

One or more grips 140 (or "handles") are shown in FIG. 1 as being integrated into the side rails 128, 130, 132, 134, the headboard 136, and the footboard 138. As is described in greater detail below, the grips 140 formed in the side rails 128, 130, 132, 134 are arranged to help facilitate patient egress from the patient support apparatus 100. It will be appreciated that the grips 140 formed in the side rails 128, 130, 132, 134, as well as the grips 140 formed in the headboard 136 and the footboard 138, can also be used by a caregiver to facilitate movement of the patient support apparatus 100 over floor surfaces. Additional grips 140 may be integrated into other components of the patient support apparatus 100, such as the intermediate frame 106. The grips 140 are shaped so as to be grasped by the patient or the caregiver. It will be appreciated that the grips 140 could be integrated with or operatively attached to any suitable portion of the patient support apparatus 100 or may be omitted from certain parts of the patient support apparatus 100 in certain versions.

Wheels 142 are coupled to the base 104 to facilitate transportation over floor surfaces F. The wheels 142 are arranged in each of four quadrants of the base 104 adjacent to corners of the base 104. In the version shown in FIGS. 1-3, the wheels 142 are caster wheels able to rotate and swivel relative to the support structure 102 during transport. Here, each of the wheels 142 forms part of a caster assembly 144 that is mounted to the base 104. It should be understood that various configurations of the caster assemblies 144 are contemplated. In addition, in some versions, the wheels 142 are not caster wheels and may be non-steerable, steerable, non-powered, powered, or combinations thereof. Additional wheels are also contemplated. For example, the patient support apparatus 100 may comprise four non-powered, non-steerable wheels, along with one or more powered wheels. In some cases, the patient support apparatus 100 may not include any wheels. In other versions, one or more auxiliary wheels (powered or non-powered), which are optionally movable between stowed positions and deployed positions, may be coupled to the support structure 102. In some cases, when auxiliary wheels are located between caster assemblies 144 and contact the floor surface in the deployed position, they cause two of the caster assemblies 144 to be lifted off the floor surface, thereby shortening a wheelbase of the patient support apparatus 100. A fifth wheel may also be arranged substantially in a center of the base 104.

The patient support apparatus 100 further comprises a lift mechanism, generally indicated at 146, which operates to raise and lower the intermediate frame 106 relative to the base 104 which, in turn, moves the patient support deck 108 relative to the base 104 between a plurality of lift configurations, including a lowered lift configuration 146A where the patient support deck 108 is positioned adjacent to the base 104 (see FIG. 3), a raised lift configuration 146B where the patient support deck 108 is elevated vertically above the base 104 (see FIGS. 1 and 2), or any desired vertical position therebetween. To this end, the lift mechanism 146 illustrated in FIGS. 1-3 comprises a first actuator 148 and a second actuator 150, which are each operatively attached between the intermediate frame 106 and the base 104 and arranged to facilitate movement of the patient support surface 112 with respect to the base 104. More specifically, the first actuator 148 may be further defined as a head-end lift actuator and configured to adjust a height of the head-end 114 of the intermediate frame 106 relative to the base 104. Similarly, the second actuator 150 may be further defined as a foot-end lift actuator and configured to adjust a height of the foot-end 116 of the intermediate frame 106 relative to the base 104.

The first and second actuators 148, 150 may be realized as linear actuators, rotary actuators, or other types of actuators, and may be electrically, hydraulically, and/or pneumatically operated or combinations thereof. It is contemplated that, in some versions, different arrangements of actuators may be employed, such as with rotary actuators coupled to the base 104 and to the intermediate frame 106 with a linkage extending therebetween. The construction of the lift mechanism 146, the first actuator 148, and/or the second actuator 150 may take on any known or conventional design, and is not limited to that specifically illustrated. By way of non-limiting example, the lift mechanism 146 could be arranged with the first and second actuators 148, 150 between the base 104 and the intermediate frame 106 in a column configuration to facilitate vertical movement of the patient support deck 108.

As is described in greater detail below, the lift mechanism 146 is also configured to move the patient support deck 108 relative to the base 104 to a patient egress configuration (see 246C, FIGS. 8-10). Here, the egress lift configuration is defined with a portion of the patient support deck 108 arranged vertically higher than the lowered lift configuration 146A. Said differently, the egress lift configuration may be further defined as an angled configuration, in which the intermediate frame 106 is at an angle relative to the base 104. Best shown by FIGS. 2 and 3, in the lowered lift configuration 146A, the intermediate frame 106 is close to, and in some instances may be resting on, the base 104. As such, the range of motion (i.e. angle) of the intermediate frame 106 may be restricted when the intermediate frame 106 is within a certain distance from the base 104. Said differently, increasing the distance between the intermediate frame 106 and the base 104 allows a corresponding increase in the range of motion of the intermediate frame 106.

Turning now to FIGS. 4-10, a second version of a patient support apparatus is shown with a differently configured lift mechanism. As will be appreciated from the subsequent description below, the second patient support apparatus is similar to the first version of the patient support apparatus 100 described above in connection with FIGS. 1-3. As such, the components and structural features of the second version of the patient support apparatus 200 that are the same as or that otherwise correspond to the first version of the patient support apparatus 100 are provided with the same reference numerals increased by 100. While the specific differences between these versions will be described in detail, for the purposes of clarity, consistency, and brevity, only certain structural features and components common between these versions will be discussed and depicted in the drawing(s) of the second version of the patient support apparatus 200. Here, unless otherwise indicated, the above description of the first version of the patient support apparatus 100 may be incorporated by reference with respect to the second version of the patient support apparatus 200 without limitation.

A mattress 284 may be disposed on the patient support deck 208 during use. The mattress 284 comprises a secondary patient support surface upon which the patient is supported. The base 204, the intermediate frame 206, and the patient support deck 208 each have a head-end 214 and a foot-end 214 corresponding to designated placement of the patient's head and feet on the patient support apparatus 200. It will be appreciated that the specific configuration of the support structure 202 may take on any known or conventional design, and is not limited to that specifically illustrated and described herein. In addition, the mattress 284 may be omitted in certain versions, such that the patient can rest directly on the patient support surface 212 defined by the deck sections 218 of the patient support deck 208. In FIGS. 6-10, which each depict right-side views of the patient support apparatus 200, the side rails are omitted for clarity.

Similar to above, the patient support apparatus 200 illustrated in FIGS. 5-10 comprises a lift mechanism, generally indicated at 246, which operates to raise and lower the intermediate frame 206 relative to the base 204 which, in turn, moves the patient support deck 208 relative to the base 204 between a plurality of lift configurations, including a lowered lift configuration 246A where the patient support deck 208 is positioned adjacent to the base 204 (see FIG. 6), a raised lift configuration 246B where the patient support deck 208 is elevated vertically above the base 204 (see FIGS. 5 and 10), or any desired position therebetween. To this end, the lift mechanism 246 illustrated in FIGS. 5-10 comprises a first actuator 248 and a second actuator 250, which are each operatively attached between the intermediate frame 206 and the base 204 and arranged to facilitate movement of the patient support surface 212 with respect to the base 204. More specifically, the first actuator 248 may be further defined as a head-end lift actuator and configured to adjust a height of the head-end 214 of the intermediate frame 206 relative to the base 204. Similarly, the second actuator 250 may be further defined as a foot-end lift actuator and configured to adjust a height of the foot-end 216 of the intermediate frame 206 relative to the base 204.

The first and second actuators 248, 250 may be realized as linear actuators, rotary actuators, or other types of actuators, and may be electrically, hydraulically, and/or pneumatically operated or combinations thereof. It is contemplated that, in some versions, different arrangements of actuators may be employed, such as with rotary actuators coupled to the base 204 and to the intermediate frame 206 with a linkage extending therebetween. The construction of the lift mechanism 246, the first actuator 248, and/or the second actuator 250 may take on any known or conventional design, and is not limited to that specifically illustrated. By way of non-limiting example, the lift mechanism 246 could comprise a "scissor" linkage arranged between the base 204 and the intermediate frame 206 with one or more actuators configured to facilitate vertical movement of the patient support deck 208.

Each of the first and second actuators 248, 250 are adjustable between respective minimum actuator positions PN and maximum actuator positions PX, and any intermediate actuator positions PI therebetween. As shown here, adjustment of the first and second actuators 248, 250 effects a change in length of the respective actuator which, in turn, moves the intermediate frame 206. The minimum actuator position PN corresponds to a position of the actuator in which the overall length is at a minimum. Likewise, the maximum actuator position PX corresponds to a position of the actuator in which the overall length is at a maximum. While the patient support apparatus 200 illustrated in FIGS. 5-10 is configured such that the maximum height of the intermediate frame 206 (i.e. the raised lift configuration 246B) corresponds to the maximum actuator position PX and the minimum height of the intermediate frame 206 (i.e. the lowered lift configuration 246A) corresponds to the minimum actuator position PN, other arrangements of lift mechanisms 246 and actuators 248, 250 may operate differently. For example, a "scissor" linkage may be configured such that the maximum actuator position PX corresponds with the minimum height of the intermediate frame 206 and the minimum actuator position PN corresponds with the maximum height of the intermediate frame 206.

Figure 6:
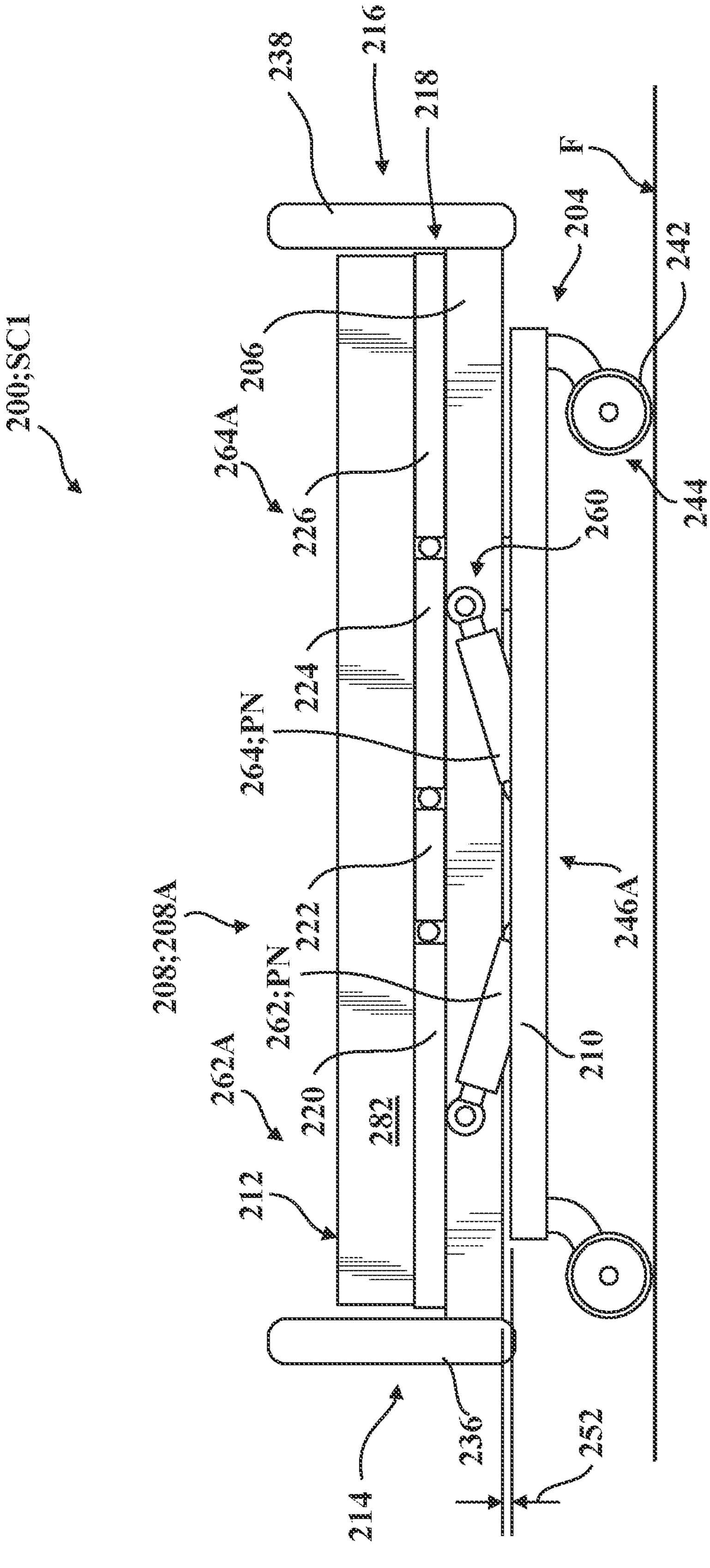
FIG. 6 is a side view of a patient support apparatus having a base, an intermediate frame, and a patient support surface, shown with the intermediate frame at a lowered position and the patient support surface arranged to support a patient in a flat position.
Figure 7:
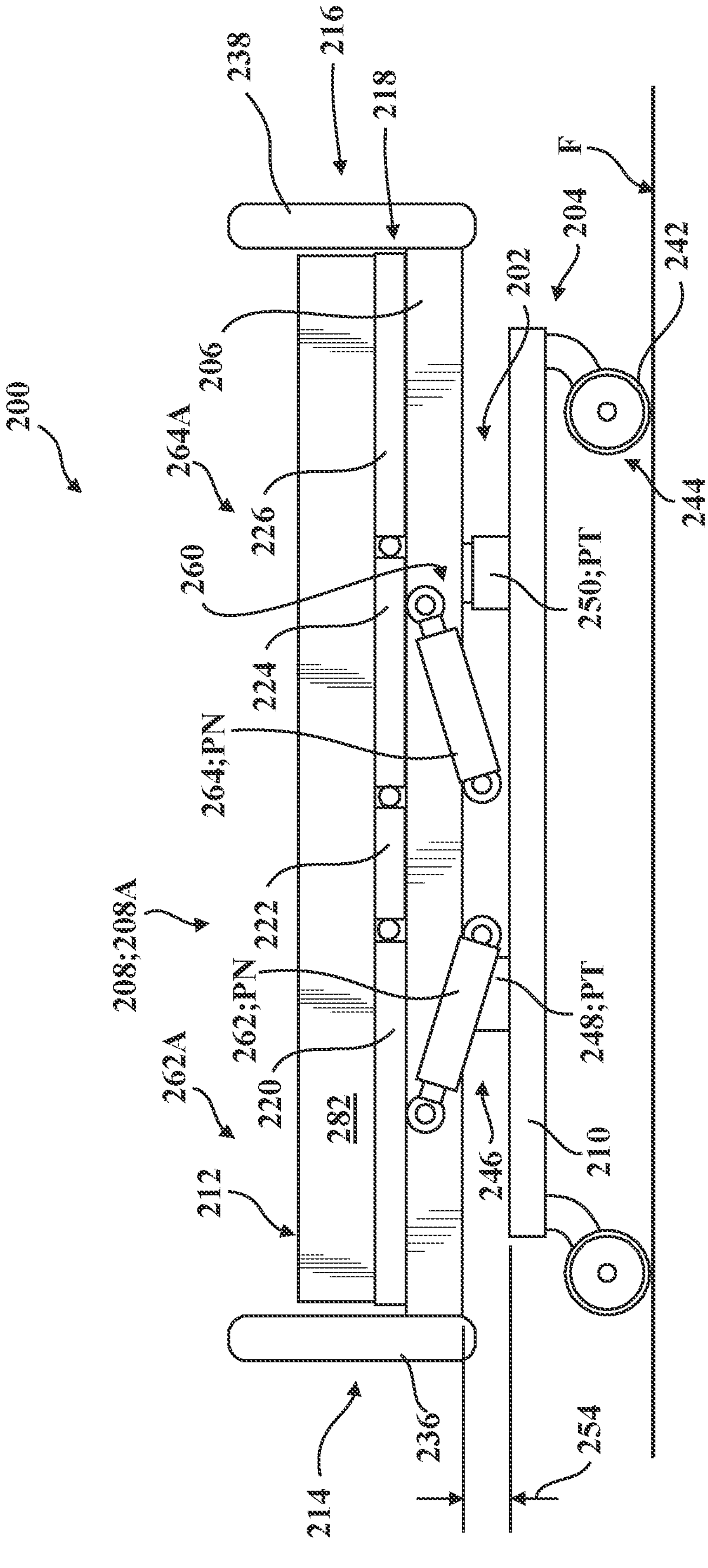
FIG. 7 is a side view of the patient support apparatus of FIG. 6 having actuators configured to support the intermediate frame and actuate the patient support surface, the patient support apparatus shown in a first intermediate position.

Shown in FIG. 6, in the lowered configuration 246A, the intermediate frame 206 is spaced a first distance 252 from the base 204, which corresponds to the minimum actuator position PN. In FIG. 7, the intermediate frame 206 is moved to an intermediate height and is spaced a second distance 254 from the base 204. The second distance 254 corresponds to a height of the intermediate frame 206 in which the maximum range of motion may be achieved. Likewise, position of the intermediate frame 206 at the second distance 254 corresponds to a threshold actuator position PT, which is between the minimum actuator position PN and the maximum actuator position PX.

Figure 8:
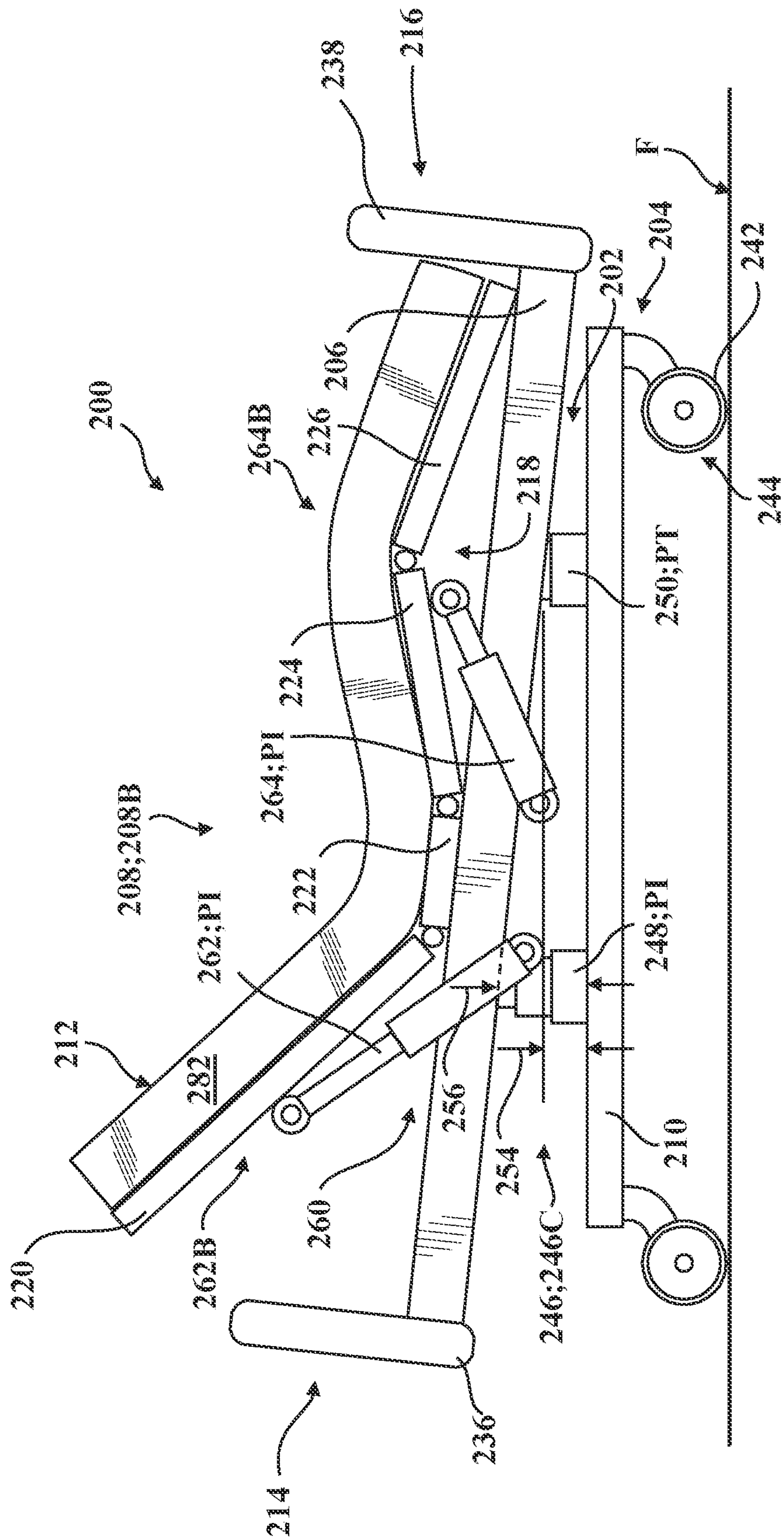
FIG. 8 is a side view of the patient support apparatus of FIG. 6 shown in a second intermediate position.

In FIG. 8, the intermediate frame 206 is at an angle relative to the base 204; the first actuator 248 is extended beyond the threshold actuator position PT and the second actuator 250 is at the threshold actuator position PT. A third distance 256 between the intermediate frame 206 and the base 204 is shown measured at an approximate location near the first actuator 248, and is illustrative of the actuator position. Here, the second distance 254, which is shown measured at an approximate location near the second actuator 250, is less than the third distance 256 and corresponds to an intermediate angle of the intermediate frame 206 relative to the base 204.

Figure 9:
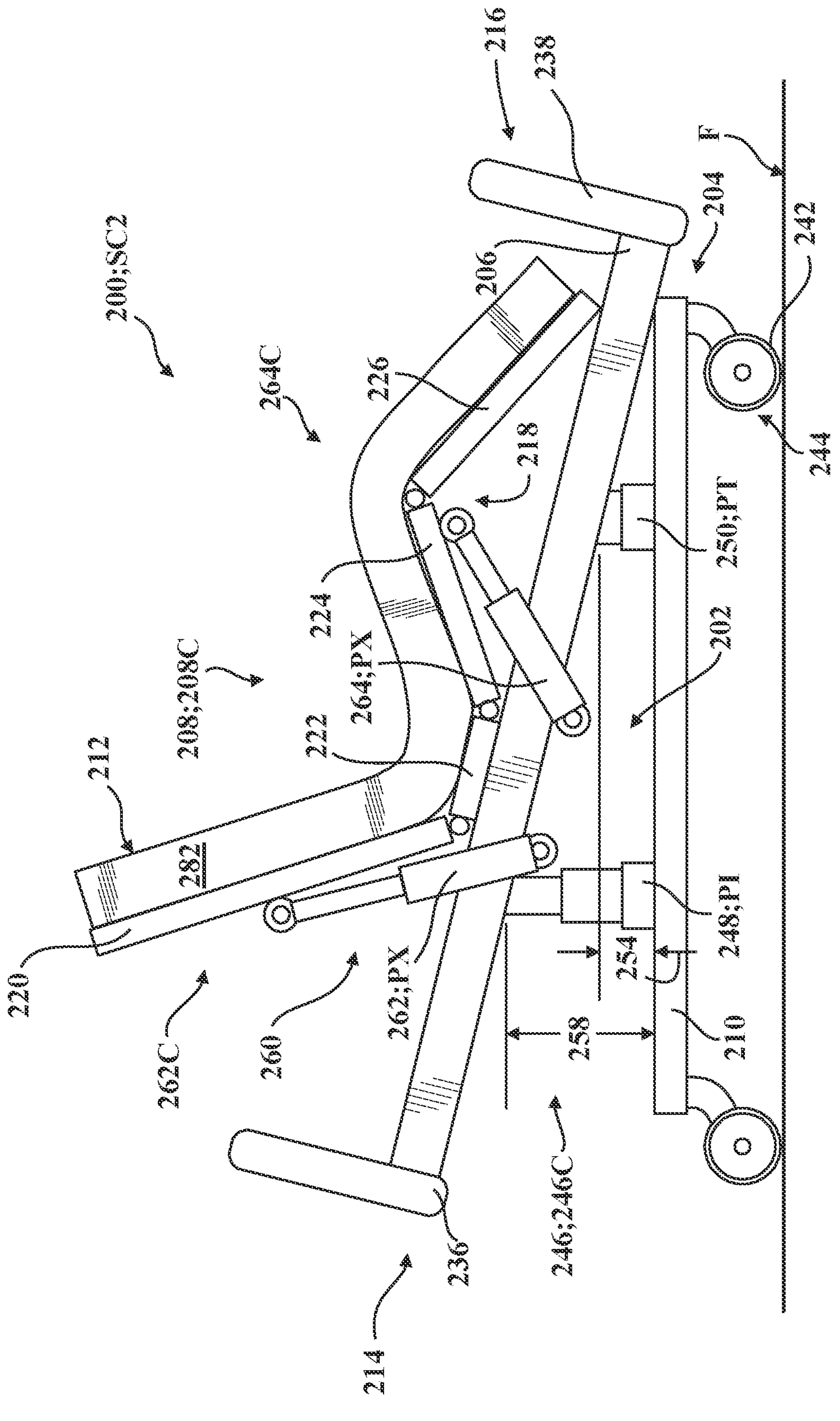
FIG. 9 is a side view of the patient support apparatus of FIG. 6 shown in a patient egress position.

In FIG. 9, the intermediate frame 206 is at another angle relative to the base 204; the first actuator 248 is extended beyond the threshold actuator position PT and the second actuator 250 is at the threshold actuator position PT. Similar to above, a fourth distance 258 between the intermediate frame 206 and the base 204 is shown measured at an approximate location near the first actuator 248, and is illustrative of the actuator position. Here too, the second actuator 250 is at the threshold actuator position PT that corresponds to the second distance 254 between the intermediate frame 206 and the base 204 measured at an approximate location near the second actuator 250. FIG. 9 shows a maximum angle of the intermediate frame 206 relative to the base 204; at the maximum angle of the intermediate frame 206 with the second actuator 250 in the threshold actuator position PT (illustrated by the second distance 254) interference between the base 204 and the intermediate frame 206 is avoided. For example, adjustment of the second actuator 250 from the threshold actuator position PT toward the minimum actuator position PN would cause interference between the foot end 216 of the intermediate frame 206 and the base 204. However, the actuators 248, 250 may be further adjusted toward the maximum actuator position PX (i.e. extending), such as shown in FIG. 10.

Figure 10:
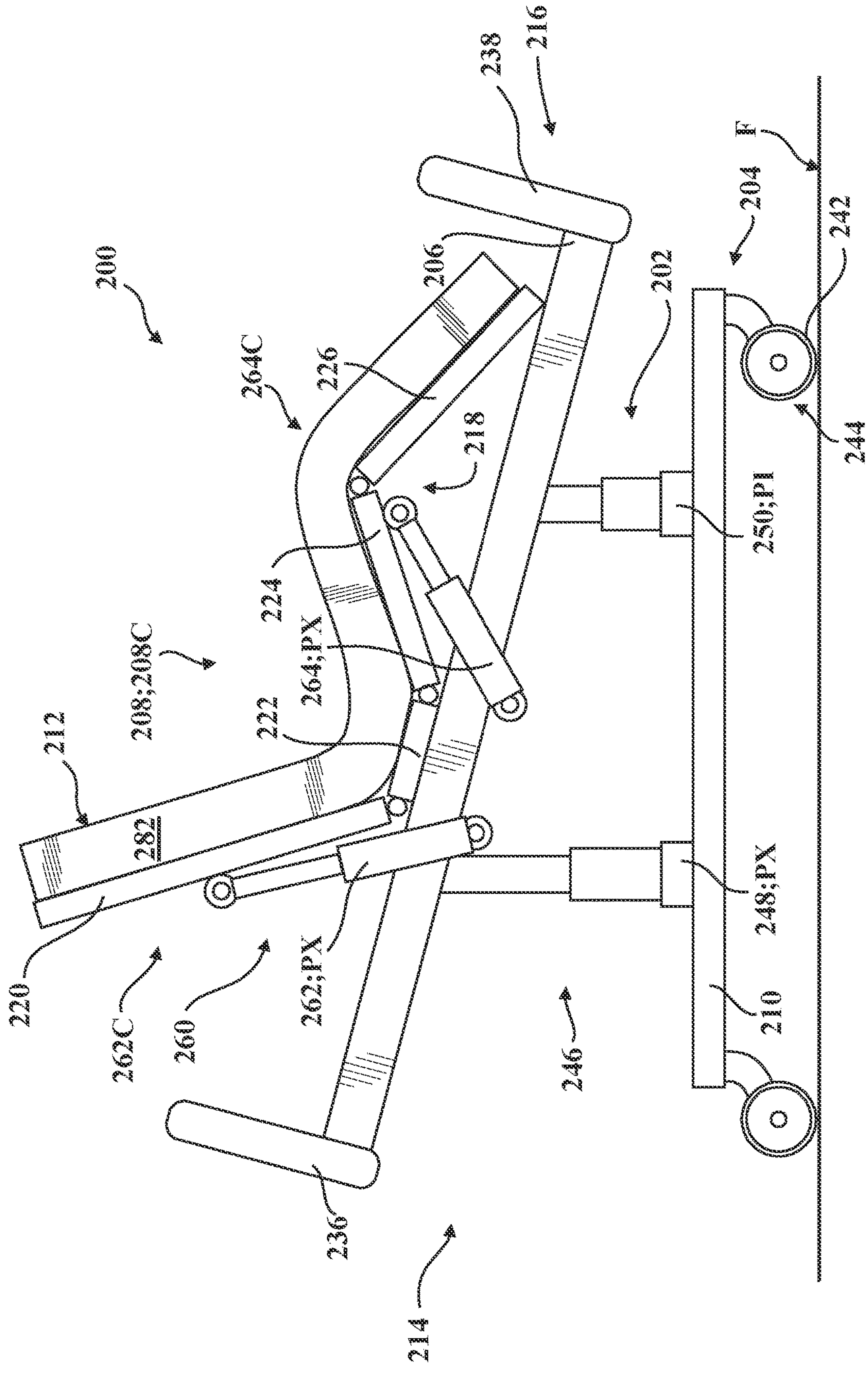
FIG. 10 is a side view of the patient support apparatus of FIG. 6 shown in a raised configuration.

The lift mechanism 246 is also configured to move the patient support deck 208 relative to the base 204 to an egress lift configuration 246C (see FIGS. 8-10). Here, the egress lift configuration 246C is defined with a portion of the patient support deck 208 arranged vertically higher than the lowered lift configuration 246A. Said differently, the egress lift configuration 246C may be further defined as an angled configuration, in which the intermediate frame 206 is at an angle relative to the base 204.

Those having ordinary skill in the art will appreciate that, depending on the specific configuration of the patient support apparatus 200, as well as the physical characteristics of the patient, positioning the lift mechanism 246 in the lowered lift configuration 246A (see FIG. 6) may place the patient support surface 212 too close to the floor surface F to facilitate proper ambulation away from the patient support apparatus 200. Put differently, patient ambulation may be better achieved in a slightly raised lift configuration where the patient can transition from sitting to standing without excessive effort. In some versions, such as the version illustrated in FIG. 9, the egress lift configuration 246C is defined by the first actuator 248 being in a raised head-end position and the second actuator 250 being in a lowered foot-end position. Other arrangements and configurations are contemplated.

As noted above, the patient support deck 208 is operatively attached to the intermediate frame 206, and the deck sections 218 are arranged for movement relative to the intermediate frame 206. In the representative version illustrated herein, the patient support apparatus 200 comprises an articulation system, generally indicated at 260, to adjust the patient support surface 212. To this end, the articulation system 260 comprises a third actuator 262 and a fourth actuator 264 each operatively attached between the deck section 218 and the intermediate frame 206 to move the deck section 218 between a plurality of support configurations. More specifically, the third actuator 262 may be further defined as a fowler deck actuator operatively attached between the intermediate frame 206 and the fowler deck section 220 to adjust an angle of the fowler deck section 220 relative to the intermediate frame 206. The third actuator 262 may be configured to move the fowler deck section 220 between a plurality of fowler configurations, including a back flat configuration 262A (see FIGS. 6 and 7), a back raised configuration 262C (see FIGS. 9 and 10), and an intermediate back configuration 262B (see FIG. 8). Similarly, the fourth actuator 264 may be further defined as a leg deck actuator operatively attached between the intermediate frame 206 and the leg deck section 224 to adjust an angle of the leg deck section 224 relative to the intermediate frame 206. The fourth actuator 264 may be configured to move the leg deck section 224 between a plurality of leg rest configurations, including a leg flat configuration 264A (see FIGS. 6 and 7), a leg raised configuration 264C (see FIGS. 9 and 10), and an intermediate leg configuration 264B (see FIG. 8).

In the representative version illustrated herein, the third and fourth actuators 262, 264 are each realized as linear actuators disposed in force-translating relationship between their respective deck sections 218 and the intermediate frame 206. More specifically, the third actuator 262 is provided between the intermediate frame 206 and the fowler section 220, and the fourth actuator 264 is provided between the intermediate frame 206 and the leg section 224. Each of the actuators 262, 264 is arranged for independent movement to position the respective deck sections 218 to adjust the shape of the patient support surface 212. Put differently, the articulation system 260 is configured to move the patient support deck 208 between a plurality of deck configurations, including a flat deck configuration 208A (see FIGS. 6 and 7), a fowler's deck configuration 208C (see FIGS. 9 and 10), and an intermediate deck configuration 208B (see FIG. 8). Other deck configurations are contemplated.

Each of the third and fourth actuators 262, 264 are adjustable between respective minimum and maximum actuator positions PN, PX, and any intermediate actuator position PI therebetween. As shown here, adjustment of the third and fourth actuators 262, 264 effects a change in length of the respective actuator which, in turn, moves the patient support deck 208. The minimum actuator position PN corresponds to a position of the actuator in which the overall length is at a minimum. Likewise, the maximum actuator position PX corresponds to a position of the actuator in which the overall length is at a maximum. More specifically, adjustment of the third actuator 262 between the minimum actuator position PN and the maximum actuator position PX results in movement of the fowler section 220 between the back flat configuration 262A and the back raised configuration 262C. Likewise, movement of the fourth actuator 264 between the minimum actuator position PN and the maximum actuator position PX results in movement of the leg section 224 between the leg flat configuration 264A and the leg raised configuration 264C.

FIGS. 6 and 7 show the deck sections 218 in the flat deck configuration 208A with the fowler section 220 in the back flat configuration 262A and the leg section 224 in the leg flat configuration 264A. Here, the third and fourth actuators 262, 264 are at respective minimum actuator positions PN. FIG. 8 shows the deck sections 218 in the intermediate deck configuration 208B with the fowler section 220 in the intermediate back configuration 262B and the leg section 224 in the intermediate leg configuration 264B. Here, the third and fourth actuators 262, 264 are at respective intermediate actuator positions. FIGS. 9 and 10 show the deck sections 218 in the fowler's deck configuration 208C with the fowler section 220 in the back raised configuration 262C and the leg section 224 in the leg raised configuration 264C. Here, the third and fourth actuators 262, 264 are at respective maximum actuator position PXs.

Those having ordinary skill in the art will appreciate that the patient support apparatus 200 could employ any suitable number of actuators 262, 264, of any suitable type or configuration sufficient to effect selective movement of the deck sections 218 relative to the support structure 202. By way of non-limiting example, the actuators 262, 264 could be linear actuators or one or more rotary actuators driven electronically and/or hydraulically, and/or controlled or driven in any suitable way. Moreover, the actuators 262, 264 could be mounted, secured, coupled, or otherwise operatively attached to the intermediate frame 206 and to the deck sections 218, either directly or indirectly, in any suitable way. In addition, one or more of the actuators 262, 264 could be omitted for certain applications. Furthermore, while the foot section 226 moves concurrently with the leg section 224 and is articulable relative thereto in response to movement of the fourth actuator 264, it will be appreciated that the foot section 226 could be provided with a dedicated fifth actuator in some versions.

Figure 4:
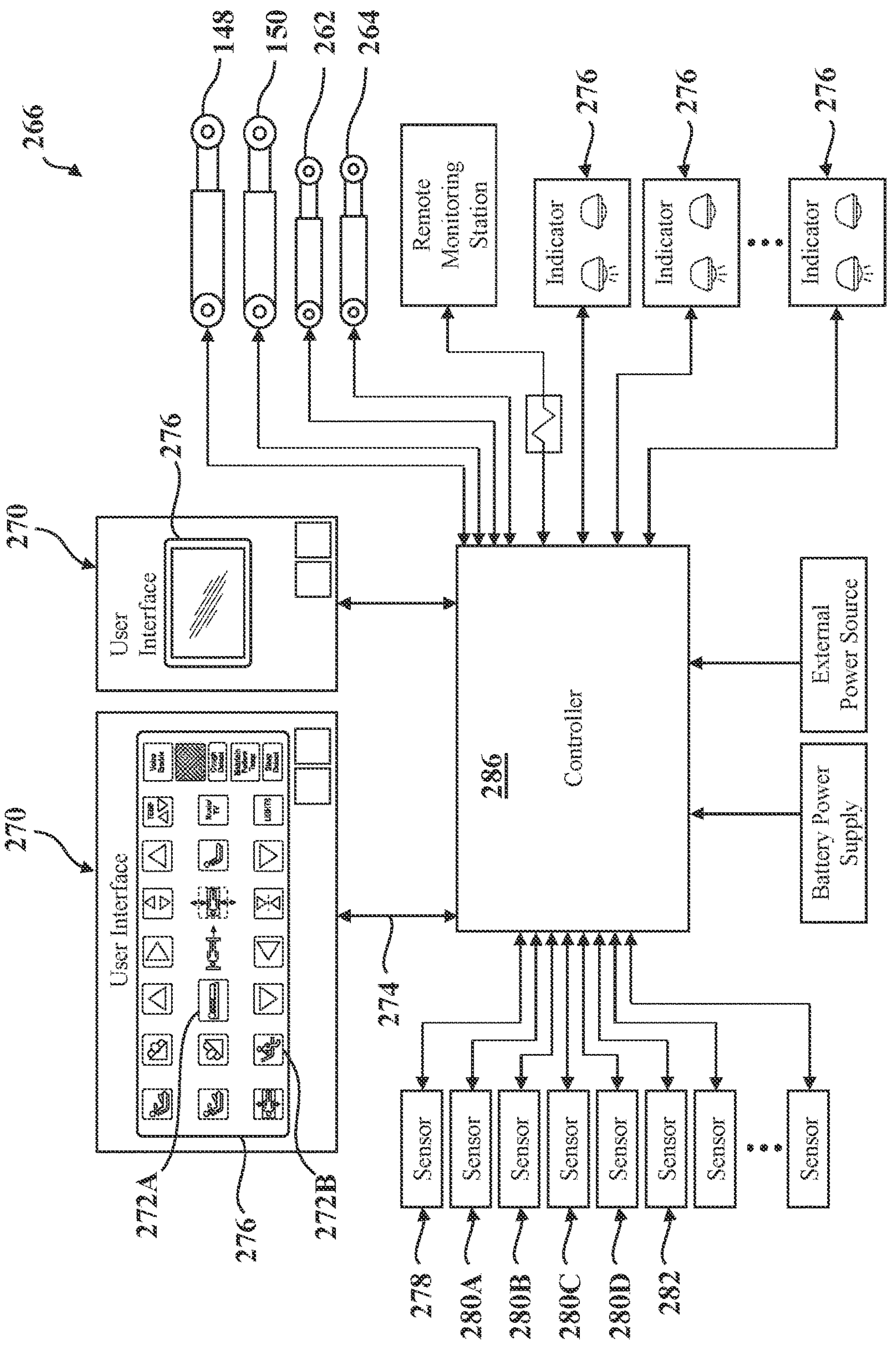
FIG. 4 is a schematic view of a control system of the patient support apparatus.
Figure 5:
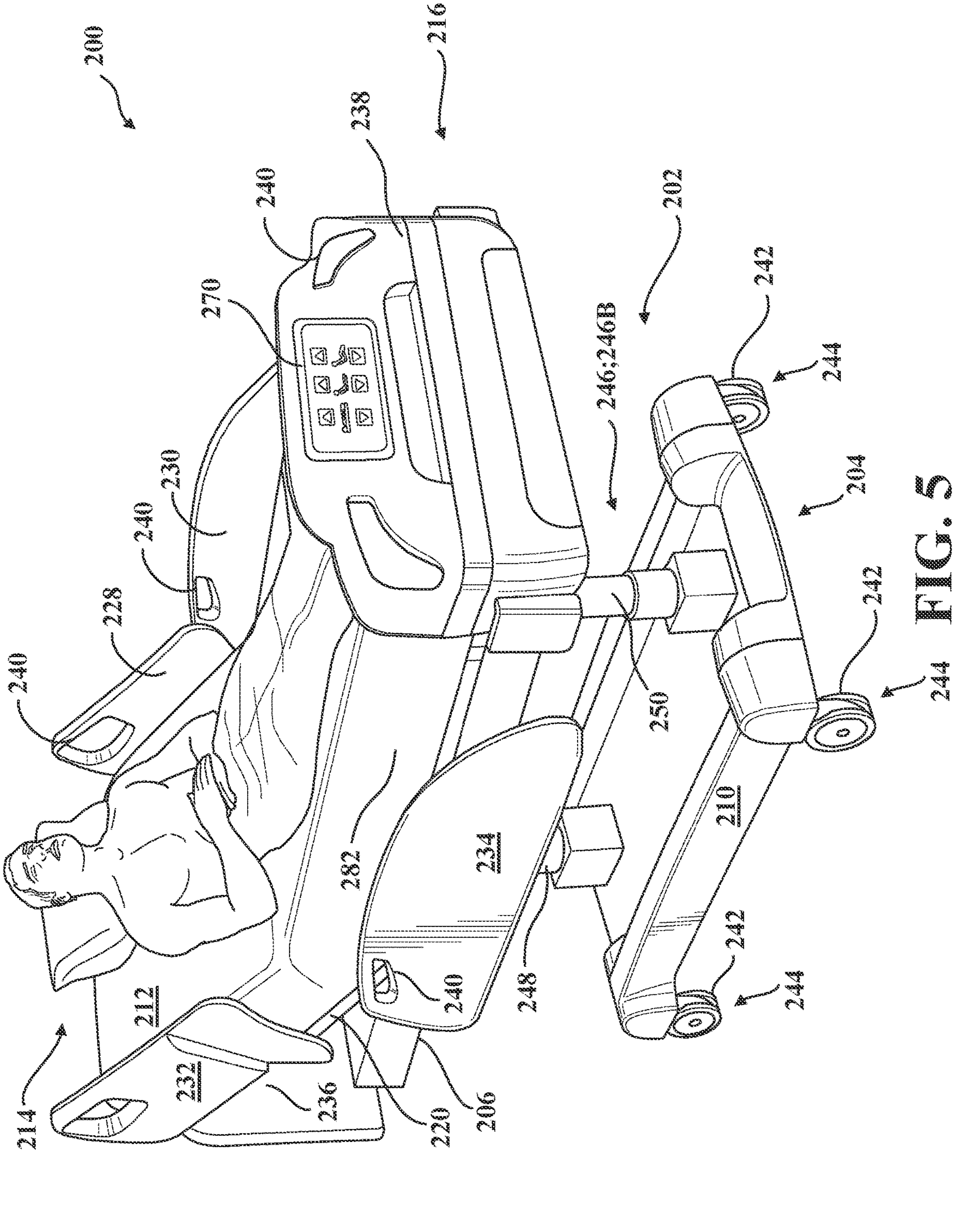
FIG. 5 is a perspective view of another patient support apparatus comprising a base, actuators, and a patient support surface with a patient supported thereon.

With reference to FIG. 4, the patient support apparatus 100, 200 employs a control system, generally indicated at 266, to effect operation of various functions of the patient support apparatus 100, 200 as described in greater detail below. To this end, and as is shown schematically in FIG. 4, the control system 266 generally comprises a controller 268 disposed in communication with one or more user interfaces 270 adapted for use by the patient and/or the caregiver to facilitate operation of one or more functions of the patient support apparatus 100, 200 and/or other devices typically utilized in patient healthcare settings (for example, television controls). In certain versions, the controller 268 is also disposed in communication with the actuators 248, 250, 262, 264, and with various sensors employed to determine certain operating conditions of the patient support apparatus 100, 200 and/or changes in patient status, behavior, position, condition, and the like as is described in greater detail below.

As noted above, the controller 268 is depicted schematically in FIG. 4, and has been omitted from certain drawings for clarity. It will be appreciated that the controller 268 and/or the control system 266 can be configured or otherwise arranged in a number of different ways, depending on the specific configuration of the patient support apparatus 100, 200. The controller 268 may comprise one or more microprocessors for processing instructions or for processing an algorithm stored in memory to control operation of the actuators 248, 250, 262, 264, communication with the user interfaces 270, sensors, and the like. Additionally or alternatively, the controller 268 may comprise one or more microcontrollers, field-programmable gate arrays, systems on a chip, discrete circuitry, and/or other suitable hardware, software, or firmware that is capable of carrying out the various functions and operations described herein. The controller 268 may be carried on-board the patient support apparatus 200, such as on the base 204, or may be remotely located. The controller 268 may comprise one or more sub-controllers configured to control the actuators 248, 250, 262, 264, sensors, and/or user interfaces 270; or one or more sub-controllers for each actuator 248, 250, 262, 264, sensor, and/or user interface 270. The controller 268 may communicate with the actuators 248, 250, 262, 264, sensors, user interfaces 270, or other systems or components via wired or wireless connections.

It will be appreciated that patient support apparatus 200 may comprise more than one user interface 270, positioned and/or configured so as to be accessible by the patient, by the caregiver, or by both the caregiver and the patient. The user interface 270 of the patient support apparatus 200 generally comprises an input device 272 configured to generate an input signal 274 in response to activation by a user which, in turn, is communicated to the controller 268. The controller 268 is responsive to the input signal 274 and can control or otherwise carry out one or more functions of the patient support apparatus 200 in response to receiving the input signal 274. Put differently, the controller 268 is configured to perform a function of the patient support apparatus 200 in response to receiving the input signal 274 from the input device 272. By way of non-limiting example, the input device 272 could be realized as one or more buttons 272A, 272B, activation of which causes the controller 268 to drive the actuators 248, 250, 262, 264 to move the patient support deck 208 and the intermediate frame 206 relative to the base 204 into a corresponding number of predetermined support configurations. Those having ordinary skill in the art will appreciate that the input device 272 of the user interface 270 could be configured in a number of different ways sufficient to generate the input signal 274.

In certain versions, as described in greater detail below, the user interface 270 may also comprise indicators 276 configured to communicate information to the user, such as an operating condition of the patient support apparatus 200 itself, a status condition of the patient, and the like. It will be appreciated that indicators 276 could be utilized, configured, and/or arranged in a number of different ways sufficient to communicate information to the patient and/or the caregiver. Here too, it will be appreciated that the user interface 270 could similarly be provided in a number of different styles, shapes, configurations, and the like. By way of non-limiting example, the user interface 270 could be realized as a touchscreen, which serves as both an input device 272 (for example, a capacitive touch interface) and an indicator 276 (for example, a display screen). Additionally, one or more user interfaces 270 could be implemented with a discrete indicator 276 but without a dedicated, localized input device 272 (for example, a light emitting diode (LED) coupled to a side rail), or vice-versa (for example, a button coupled to a side rail). Thus, it will be appreciated that the user interface 270 could comprise a number of indicators 276 and/or input devices 272 each coupled to the same or different components or structural features of the patient support apparatus 200 in certain versions.

With continued reference to FIG. 4, as noted above, the patient support apparatus 200 utilizes various sensors disposed in communication with the controller 268 to monitor operating conditions of the patient support apparatus 200 and/or status conditions of the patient. In some versions, the patient support apparatus 200 comprises a patient sensor 278 to determine the presence and/or position of the patient supported on the patient support deck 208. To this end, the patient sensor may comprise one or more load cells disposed between the intermediate frame 206 and the patient support deck 208, which monitor changes in the patient's weight distribution about the patient support surface 212. However, it will be appreciated that the patient sensor could be of any suitable type or configuration sufficient to determine the presence of and/or position of the patient, and could be disposed in any suitable location. By way of non-limiting example, the patient sensor could be realized as a camera or sensor configured to determine a position and/or orientation of the patient on the patient support surface 212. Other types of patient sensors 278, such as those configured to respond to changes in the patient's status and/or vital signs, are contemplated.

In some versions, the patient support apparatus 200 may comprise actuator sensors 280 to determine a position of a respective actuator 248, 250, 262, 264 between respective minimum and maximum actuator positions PN, PX. More specifically, a first actuator sensor 280A is arranged to determine or measure the position of the first actuator 248 between the minimum actuator position PN and the maximum actuator position PX. Similarly, a second actuator sensor 280B is arranged to determine or measure the position of the second actuator 250 between the minimum actuator position PN and the maximum actuator position PX. Similarly, a third actuator sensor 280C is arranged to determine or measure the position of the third actuator 262 between the minimum actuator position PN and the maximum actuator position PX. Furthermore, a fourth actuator sensor 280D is arranged to determine or measure the position of the fourth actuator 264 between the minimum actuator position PN and the maximum actuator position PX.

Further, the patient support apparatus 200 may comprise a side rail sensor 282 to determine movement of one of the first, second, third, and fourth side rails 228, 230, 232, 234 between the side rail positions. Those having ordinary skill in the art will appreciate that the actuator sensors 280 and/or the side rail sensors 282 are disposed in communication with the controller 268 and could be realized in a number of different ways, such as with one or more linear potentiometers, range sensors, hall-effect sensors, limit switches, accelerometers, gyroscopes, and the like generally configured or arranged to measure position, height, and/or movement. Further, certain sensors described above could be encoders, current sensors, and the like coupled to or in communication with one of the actuators 248, 250, 262, 264. Moreover, it will be appreciated that the functionality afforded by the sensors described above could be entirely or partially realized with software or code for certain applications.

As noted above, illustrated in FIG. 9, the egress configuration 246C of the lift mechanism 246 and the fowler's deck configuration 208C of the articulation system 260 are advantageously implemented in connection with patient support apparatuses 200 that is configured such that positioning the first and second actuators 248, 250 at their respective minimum actuator positions PN (depicted in FIG. 6) may be too low for the patient to egress from and ingress to the patient support apparatus 200 easily. Here, the user interface 270 may further include an input device 272 dedicated to moving the patient support apparatus 200 into the egress configuration. When this input device 272 is actuated by the caregiver, movement of the lift mechanism 246 to the egress configuration 208C is further defined by the controller 268 driving the first actuator 248 to move the head end 214 of the intermediate frame 206 to a raised position, and driving the second actuator 250 to move the foot end 216 of the intermediate frame 206 to a lowered position. This configuration places the intermediate frame 206 into a slight reverse Trendelenburg configuration. Here too, the controller 268 also adjusts the articulation system 260 so as to advantageously position the patient for egress from the patient support apparatus 200 by moving to the fowler's deck configuration 208C. More specifically, in the representative version illustrated herein, movement of the articulation system 260 to the fowler's deck configuration 208C is further defined by the controller 268 driving the third actuator 262 to move the fowler section 220 to the back raised configuration 262C, and driving the fourth actuator 264 to move the leg section 224 to the leg raised configuration 264C (see FIGS. 9 and 10; compare with FIGS. 6 and 7).

The egress lift configuration 246C and the fowler's deck configuration 208C depicted in FIG. 9 help position the patient's feet closer to the floor surface F than depicted in FIG. 6 where the fourth actuator 264 positions the leg section 224 and the foot section 226 in the leg flat configuration 264A and where the first and second actuators 248, 250 are each in their respective lowered positions. Thus, the patient support apparatus 200 is able to position the patient in ways that are advantageous for ambulation to the floor surface F by bringing their feet as close as possible to the floor surface F while providing a stable patient support surface 212 from which to sit upward.

Referring to FIGS. 6-11, it will be appreciated that the controller 268 can be configured in a number of different ways to facilitate moving the lift mechanism 246 to the egress lift configuration 246C and the articulation system 260 to the fowler's deck configuration 208C. For example, the controller 268 may be configured to drive the actuators 248, 250, 262, 264 independently and sequentially in response to actuation of the input device 272A, 272B. By way of illustrative example, if the patient support apparatus 200 is arranged as depicted in FIG. 6, with the lift mechanism 246 in the lowered lift configuration 246A and with the articulation system 260 in the flat deck configuration 208A, it is conceivable that the controller 268 could first drive the third actuator 262 to move the fowler section 220 from the back flat configuration 262A to the back raised configuration 262C (see FIG. 9) before driving the fourth actuator 264 or either of the first and second actuators 248, 250. In some situations the caregiver may be expecting, or prefer, the control system 266 to operate differently in response to actuating the input device 272. Furthermore, this may result in undesirable movement (i.e. interference) as described above, if the intermediate frame 206 is in a lowered position and moves toward an angled position.

Depending on the specific configuration of the patient support apparatus 200, it may be advantageous to drive certain actuators 248, 250, 262, 264 before or after others. Illustrated in FIG. 11, the controller 268 may configured to simultaneously operate the first, second, third, and fourth actuators 248, 250, 262, 264 to move the patient support surface 212 from a first support configuration SC1 toward a second support configuration SC2, which is defined by respective predetermined target first, second, third, and fourth actuator positions 286, 288, 290, 292. Subsequently, the controller 268 may interrupt operation of the second actuator 250 at the predetermined target second actuator position 288 to stop movement of the second support actuator 250 while continuing operation of the first, third, and fourth actuators 248, 262, 264. The controller 268 may then substantially simultaneously interrupt operation of the first, third, and fourth actuators 248, 262, 264 at respective predetermined target first, third, and fourth actuator positions 286, 290, 292 to place the patient support surface 212 in the second support configuration SC2.

The controller 268 may be further configured to simultaneously operate each of the first, second, third, and fourth actuators 248, 250, 262, 264 toward their respective target positions 286, 288, 290, 292. In some versions, the controller 268 is configured to determine, for each of the actuators 248, 250, 262, 26,4 an independent operating rate, or drive speed, to effect coordinated motion to the second support configuration SC2. Here, by monitoring the positions of each of the actuators 248, 250, 262, 264 via the respective sensors 280A-D, the controller 268 is able to determine respective operating rates to operate two or more actuators 248, 250, 262, 264 to arrive at the respective target positions 286, 288, 290, 292 and configurations together from wherever the actuators 248, 250, 262, 264 are positioned when the user actuates the input device 272. In some versions, the controller 268 is configured to determine independent operating rates for each of the actuators 248, 250, 262, 264 such that interrupting operation at least two of the target first, second, third, and fourth actuator positions 286, 288, 290, 292 occurs substantially simultaneously. However, it will be appreciated that other configurations and types of coordinated movement are contemplated. The phrase "substantially simultaneously" refers to arrivals that are not precisely simultaneously, but are not otherwise readily discernable by a user as occurring at separate times.

Figure 11:
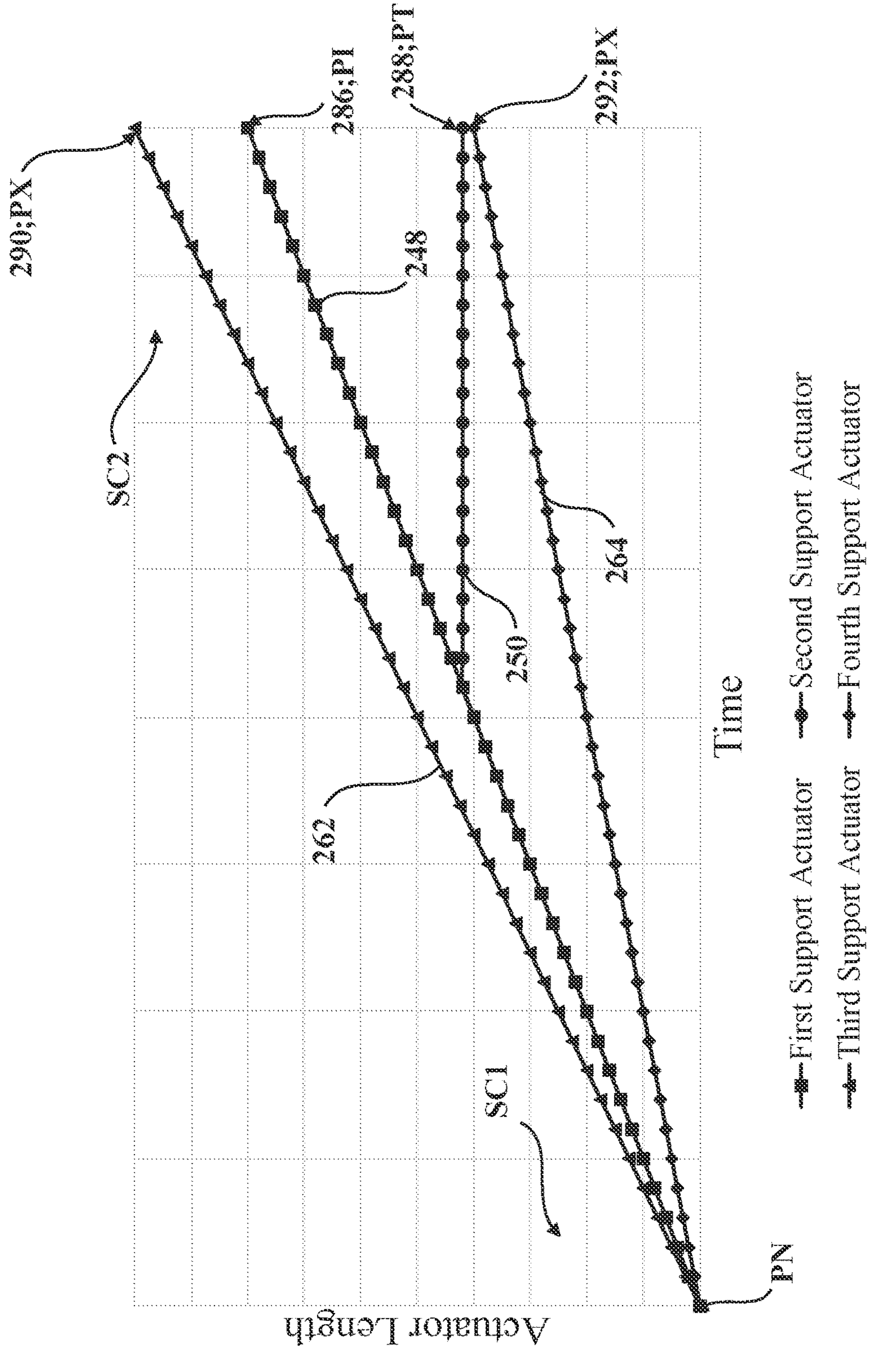
FIG. 11 is a chart showing actuator length plotted as a function of time.

For example, and with reference to FIG. 11, the controller 268 may determine that in the first support configuration SC1, the first and second actuators 248, 250 are at the minimum actuator positions PN such that the lift mechanism 246 is in the lowered configuration 246A. In response to a caregiver actuating the input device 272B associated with the second support configuration SC2, the controller 268 determines the operating rate of each of the actuators 248, 250, 262, 264 based on the predetermined target first, second, third, and fourth actuator positions 286, 288, 290, 292. Here, the second configuration is the egress configuration 246C with the support deck 208 in the fowler's deck configuration 208C. In order to prevent interference, the controller 268 simultaneously operates the first and second actuators 248, 250 at a common operating rate until the second actuator 250 reaches the target second actuator position 288, which is equal to the threshold actuator position PT. The controller further simultaneously begins operating the third and fourth actuators 262, 264. When the second actuator 250 reaches the predetermined target second actuator position 288, the controller 268 interrupts operation of the second actuator 250 to stop movement of the second support actuator 250 while continuing operation of the first, third, and fourth actuators 248, 262, 264. The controller 268 then substantially simultaneously interrupts operation of the first, third, and fourth actuators 248, 262, 264 at the respective predetermined target first, third, and fourth actuator positions 286, 290, 292 to place the patient support surface 212 in the second support configuration SC2.

If the patient support apparatus 200 is in the egress configuration 246C with the support deck 208 in the fowler's deck configuration 208C and the caregiver actuates the input device 272A to place the patient support apparatus 200 in the lowered configuration 246A with the support deck 208 in the flat deck configuration 208A the controller 268 may simultaneously operate only the first, third and fourth actuators 248, 262, 264. In order to prevent interference, the controller 268 operates only the first, third and fourth actuators 248, 262, 264 toward predetermined target first, third and fourth actuator positions and when the first, third and fourth actuators 248, 262, 264 reach the predetermined threshold actuator position PT the controller 268 begins operating the second actuator 250 while continuing operation of the first, third, and fourth actuators 248, 262, 264. The controller 268 then substantially simultaneously interrupts operation of the first, second, third, and fourth actuators 248, 250, 262, 264 at the respective predetermined target first, second, third, and fourth actuator positions 286, 290, 292 to place the patient support surface 212 in the second support configuration SC2. The controller 268 may further determine the respective operating rates for each of the first, second, third, and fourth actuators 248, 250, 262, 264 based at least partially on the respective current first, second, third, and fourth actuator positions such that the first, second, third, and fourth actuators 248, 250, 262, 264 simultaneously reach the respective predetermined target first, second, third, and fourth actuator positions. Here, the first actuator 248 and the second actuator 250 may be operated at a common operating rate when the controller 268 begins operating the second actuator 250. Said differently, when the first, third, and fourth actuators 248, 262, 264 reach the predetermined threshold actuator position PT the controller 268 begins operating the second actuator 250 at the same operating rate as the first actuator 248.

Several examples have been discussed in the foregoing description. However, the examples discussed herein are not intended to be exhaustive or limit the invention to any particular form. The terminology that has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A method for adjusting a patient support surface of a patient support apparatus from a first support configuration to a second support configuration, the patient support apparatus having first, second, third, and fourth support actuators each being operable to move the patient support surface relative to a floor surface and each being adjustable between respective minimum and maximum actuator positions, the method comprising:

simultaneously operating the first, second, third, and fourth support actuators to move the patient support surface toward the second support configuration;

interrupting operation of the second support actuator at a predetermined target second actuator position to stop movement of the second support actuator while continuing operation of the first, third, and fourth support actuators; and simultaneously interrupting operation of the first, third, and fourth support actuators at respective predetermined target first, third, and fourth actuator positions to place the patient support surface in the second support configuration.

II. The method as set forth in clause I, wherein the patient support apparatus has a base arranged for movement about the floor surface and an intermediate frame supporting the patient support surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein simultaneously operating the head-end lift actuator, the foot-end lift actuator, the third support actuator, and the fourth support actuator to move the patient support surface toward the second support configuration includes adjusting a height of the patient support surface relative to the base with the head-end lift actuator and the foot-end lift actuator.

III. The method as set forth in clause II, wherein the patient support apparatus has a fowler deck section and a leg deck section at least partially defining the patient support surface and being coupled to an intermediate frame;

wherein the third support actuator is further defined as a fowler deck actuator operatively attached between the intermediate frame and the fowler deck section to adjust an angle of the fowler deck section relative to the intermediate frame;

wherein the fourth support actuator is further defined as a leg deck actuator operatively attached between the intermediate frame and the leg deck section to adjust an angle of the leg deck section relative to the intermediate frame; and wherein simultaneously operating the first support actuator, the second support actuator, the fowler deck actuator, and the leg deck actuator to move the patient support surface toward the second support configuration includes adjusting the patient support surface relative to the intermediate frame with the fowler deck actuator and the leg deck actuator.

IV. The method as set forth in clause III, wherein the patient support apparatus has a base arranged for movement about the floor surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein simultaneously operating the head-end lift actuator, the foot-end lift actuator, the fowler deck actuator, and the leg deck actuator to move the patient support surface toward the second support configuration includes adjusting a height of the patient support surface relative to the base with the head-end lift actuator and the foot-end lift actuator.

V. The method as set forth in any of clauses I-IV, further comprising determining, with a controller disposed in communication with the first, second, third, and fourth support actuators, respective current first, second, third, and fourth actuator positions of the first, second, third, and fourth support actuators between the respective minimum and maximum actuator positions.

VI. The method as set forth in clause V, further comprising determining, with the controller, the respective predetermined target first, second, third, and fourth actuator positions of the first, second, third, and fourth support actuators between the respective minimum and maximum actuator positions to define the second support configuration of the patient support surface.

VII. The method as set forth in clause V, further comprising determining, with the controller, respective operating rates for each of the first, second, third, and fourth support actuators based at least partially on the respective current first, second, third, and fourth actuator positions such that the first, third, and fourth support actuators simultaneously reach the respective predetermined target first, third, and fourth actuator positions.

VIII. The method as set forth in clause VII, wherein simultaneously operating the first, second, third, and fourth support actuators to move the patient support surface toward the second support configuration includes simultaneously operating the first and second support actuators at a common operating rate.

IX. The method as set forth in any of clauses I-VIII, wherein simultaneously operating the first, second, third, and fourth support actuators to move the patient support surface toward the second support configuration occurs in response to determining user engagement with a second user input associated with the second patient support configuration.

X. The method as set forth in any of clauses I-IX, wherein the patient support apparatus has a user interface with a first user input associated with the first patient support configuration and with a second use input associated with the second patient support configuration;

wherein the first patient support configuration is further defined by the patient support surface being in a substantially flat and lowered configuration; and wherein the second patient support configuration is further defined by the patient support surface being in an egress configuration.

XI. A method for adjusting a patient support surface of a patient support apparatus from a first support configuration to a second support configuration, the patient support apparatus having first, second, third, and fourth support actuators each being operable to move the patient support surface relative to a floor surface and each being adjustable between respective minimum and maximum actuator positions, the method comprising:

simultaneously operating only the first, third, and fourth support actuators to move the patient support surface toward the second support configuration;

operating the second support actuator when the first, third, and fourth support actuators are at respective predetermined threshold first, third, and fourth actuator positions while continuing operation of the first, third, and fourth support actuators; and simultaneously interrupting operation of the first, second, third, and fourth support actuators at respective predetermined target first, second, third, and fourth actuator positions to place the patient support surface in the second support configuration.

XII. The method as set forth in clause XI, wherein the patient support apparatus has a base arranged for movement about the floor surface and an intermediate frame supporting the patient support surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein operating the foot-end lift actuator, when the head-end lift actuator, the third support actuator, and the fourth support actuator are at respective predetermined threshold first, third, and fourth actuator positions while continuing operation of the head-end, third, and fourth support actuators includes adjusting a height of the patient support surface relative to the base with the head-end lift actuator and the foot-end lift actuator.

XIII. The method as set forth in clause XII, wherein the patient support apparatus has a fowler deck section and a leg deck section at least partially defining the patient support surface and being coupled to an intermediate frame;

wherein the third support actuator is further defined as a fowler deck actuator operatively attached between the intermediate frame and the fowler deck section to adjust an angle of the fowler deck section relative to the intermediate frame;

wherein the fourth support actuator is further defined as a leg deck actuator operatively attached between the intermediate frame and the leg deck section to adjust an angle of the leg deck section relative to the intermediate frame; and wherein simultaneously operating the first support actuator, the fowler deck actuator, and the leg deck actuator to move the patient support surface toward the second support configuration includes adjusting the patient support surface relative to the intermediate frame with the fowler deck actuator and the leg deck actuator.

XIV. The method as set forth in clause XIII, wherein the patient support apparatus has a base arranged for movement about the floor surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein simultaneously operating the head-end lift actuator, the foot-end lift actuator, the fowler deck actuator, and the leg deck actuator to move the patient support surface toward the second support configuration includes adjusting a height of the patient support surface relative to the base with the head-end lift actuator and the foot-end lift actuator.

XV. The method as set forth in any of clauses XI-XIV, further comprising determining, with a controller disposed in communication with the first, second, third, and fourth support actuators, respective current first, second, third, and fourth actuator positions of the first, second, third, and fourth support actuators between the respective minimum and maximum actuator positions.

XVI. The method as set forth in clause XV, further comprising determining, with the controller, the respective predetermined target first, second, third, and fourth actuator positions of the first, second, third, and fourth support actuators between the respective minimum and maximum actuator positions to define the second support configuration of the patient support surface.

XVII. The method as set forth in clause XV, further comprising determining, with the controller, respective operating rates for each of the first, second, third, and fourth support actuators based at least partially on the respective current first, second, third, and fourth actuator positions such that the first, second, third, and fourth support actuators simultaneously reach the respective predetermined target first, second, third, and fourth actuator positions.

XVIII. The method as set forth in clause XVII, wherein operating the second support actuator when the first, second, third, and fourth support actuators are at respective predetermined threshold first, third, and fourth actuator positions includes operating the first and second support actuators at a common operating rate.

XIX. The method as set forth in any of clauses XI-XVIII, wherein simultaneously operating the first, second, third, and fourth support actuators to move the patient support surface toward the second support configuration occurs in response to determining user engagement with a second user input associated with the second patient support configuration.

XX. The method as set forth in any preceding clause, wherein the patient support apparatus has a user interface with a first user input associated with the first patient support configuration and with a second use input associated with the second patient support configuration;

wherein the first patient support configuration is further defined by the patient support surface being in an egress configuration; and wherein the second patient support configuration is further defined by the patient support surface being in a substantially flat and lowered configuration.

What is claimed is:

1. A method for adjusting a patient support surface of a patient support apparatus from a first support configuration to a second support configuration, the patient support apparatus having first, second, third, and fourth support actuators each being operable to move the patient support surface relative to a floor surface and each being adjustable between respective minimum and maximum actuator positions, the method comprising:

simultaneously initiating operation of the first, second, third, and fourth support actuators to move the patient support surface toward the second support configuration;

interrupting operation of the second support actuator at a predetermined target second actuator position to stop movement of the second support actuator while continuing operation of the first, third, and fourth support actuators; and simultaneously interrupting operation of the first, third, and fourth support actuators at respective predetermined target first, third, and fourth actuator positions to place the patient support surface in the second support configuration.

2. The method as set forth in claim 1, wherein the patient support apparatus has a base arranged for movement about the floor surface and an intermediate frame supporting the patient support surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein simultaneously operating the head-end lift actuator, the foot-end lift actuator, the third support actuator, and the fourth support actuator to move the patient support surface toward the second support configuration includes adjusting a height of the patient support surface relative to the base with the head-end lift actuator and the foot-end lift actuator.

3. The method as set forth in claim 1, wherein the patient support apparatus has a fowler deck section and a leg deck section at least partially defining the patient support surface and being coupled to an intermediate frame;

wherein the third support actuator is further defined as a fowler deck actuator operatively attached between the intermediate frame and the fowler deck section to adjust an angle of the fowler deck section relative to the intermediate frame;

wherein the fourth support actuator is further defined as a leg deck actuator operatively attached between the intermediate frame and the leg deck section to adjust an angle of the leg deck section relative to the intermediate frame; and wherein simultaneously operating the first support actuator, the second support actuator, the fowler deck actuator, and the leg deck actuator to move the patient support surface toward the second support configuration includes adjusting the patient support surface relative to the intermediate frame with the fowler deck actuator and the leg deck actuator.

4. The method as set forth in claim 3, wherein the patient support apparatus has a base arranged for movement about the floor surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein simultaneously operating the head-end lift actuator, the foot-end lift actuator, the fowler deck actuator, and the leg deck actuator to move the patient support surface toward the second support configuration includes adjusting a height of the patient support surface relative to the base with the head-end lift actuator and the foot-end lift actuator.

5. The method as set forth in claim 1, further comprising determining, with a controller disposed in communication with the first, second, third, and fourth support actuators, respective current first, second, third, and fourth actuator positions of the first, second, third, and fourth support actuators between the respective minimum and maximum actuator positions.

6. The method as set forth in claim 5, further comprising determining, with the controller, the respective predetermined target first, second, third, and fourth actuator positions of the first, second, third, and fourth support actuators between the respective minimum and maximum actuator positions to define the second support configuration of the patient support surface.

7. The method as set forth in claim 5, further comprising determining, with the controller, respective operating rates for each of the first, second, third, and fourth support actuators based at least partially on the respective current first, second, third, and fourth actuator positions such that the first, third, and fourth support actuators simultaneously reach the respective predetermined target first, third, and fourth actuator positions.

8. The method as set forth in claim 7, wherein simultaneously operating the first, second, third, and fourth support actuators to move the patient support surface toward the second support configuration includes simultaneously operating the first and second support actuators at a common operating rate.

9. The method as set forth in claim 1, wherein the patient support apparatus has a user interface with one or more user inputs including a user input associated with the second support configuration; and wherein simultaneously operating the first, second, third, and fourth support actuators to move the patient support surface toward the second support configuration occurs in response to determining user engagement with the user input associated with the second support configuration.

10. The method as set forth in claim 1, wherein the patient support apparatus has a user interface with a first user input associated with the first support configuration and with a second user input associated with the second support configuration;

wherein the first support configuration is further defined by the patient support surface being in a substantially flat and lowered configuration; and wherein the second support configuration is further defined by the patient support surface being in an egress configuration.

11. The method as set forth in claim 1, wherein the patient support apparatus has a user interface with a first user input associated with the first support configuration and with a second user input associated with the second support configuration;

wherein the first support configuration is further defined by the patient support surface being in an egress configuration; and wherein the second support configuration is further defined by the patient support surface being in a substantially flat and lowered configuration.

12. A method for adjusting a patient support surface of a patient support apparatus from a first support configuration to a second support configuration, the patient support apparatus having first, second, third, and fourth support actuators each being operable to move the patient support surface relative to a floor surface and each being adjustable between respective minimum and maximum actuator positions, the method comprising:

simultaneously initiating operation of only the first, third, and fourth support actuators to move the patient support surface toward the second support configuration;

operating the second support actuator when the first, third, and fourth support actuators are at respective predetermined threshold first, third, and fourth actuator positions while continuing operation of the first, third, and fourth support actuators; and simultaneously interrupting operation of the first, second, third, and fourth support actuators at respective predetermined target first, second, third, and fourth actuator positions to place the patient support surface in the second support configuration.

13. The method as set forth in claim 12, wherein the patient support apparatus has a base arranged for movement about the floor surface and an intermediate frame supporting the patient support surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein operating the foot-end lift actuator, when the head-end lift actuator, the third support actuator, and the fourth support actuator are at respective predetermined threshold first, third, and fourth actuator positions while continuing operation of the head-end, third, and fourth support actuators includes adjusting a height of the patient support surface relative to the base with the head-end lift actuator and the foot-end lift actuator.

14. The method as set forth in claim 12, wherein the patient support apparatus has a fowler deck section and a leg deck section at least partially defining the patient support surface and being coupled to an intermediate frame;

wherein the third support actuator is further defined as a fowler deck actuator operatively attached between the intermediate frame and the fowler deck section to adjust an angle of the fowler deck section relative to the intermediate frame;

wherein the fourth support actuator is further defined as a leg deck actuator operatively attached between the intermediate frame and the leg deck section to adjust an angle of the leg deck section relative to the intermediate frame; and wherein simultaneously operating the first support actuator, the fowler deck actuator, and the leg deck actuator to move the patient support surface toward the second support configuration includes adjusting the patient support surface relative to the intermediate frame with the fowler deck actuator and the leg deck actuator.

15. The method as set forth in claim 14, wherein the patient support apparatus has a base arranged for movement about the floor surface;

wherein the first support actuator is further defined as a head-end lift actuator operatively attached between the base and the intermediate frame to adjust a head-end height of the patient support surface relative to the base;

wherein the second support actuator is further defined as a foot-end lift actuator operatively attached between the base and the intermediate frame to adjust a foot-end height of the patient support surface relative to the base; and wherein simultaneously operating the head-end lift actuator, the foot-end lift actuator, the fowler deck actuator, and the leg deck actuator to move the patient support surface toward the second support configuration includes adjusting a height of the patient support surface relative to the base with the head-end lift actuator and the foot-end lift actuator.

16. The method as set forth in claim 12, further comprising determining, with a controller disposed in communication with the first, second, third, and fourth support actuators, respective current first, second, third, and fourth actuator positions of the first, second, third, and fourth support actuators between the respective minimum and maximum actuator positions.

17. The method as set forth in claim 16, further comprising determining, with the controller, the respective predetermined target first, second, third, and fourth actuator positions of the first, second, third, and fourth support actuators between the respective minimum and maximum actuator positions to define the second support configuration of the patient support surface.

18. The method as set forth in claim 16, further comprising determining, with the controller, respective operating rates for each of the first, second, third, and fourth support actuators based at least partially on the respective current first, second, third, and fourth actuator positions such that the first, second, third, and fourth support actuators simultaneously reach the respective predetermined target first, second, third, and fourth actuator positions.

19. The method as set forth in claim 18, wherein operating the second support actuator when the first, second, third, and fourth support actuators are at respective predetermined threshold first, third, and fourth actuator positions includes operating the first and second support actuators at a common operating rate.

20. The method as set forth in claim 12, wherein the patient support apparatus has a user interface with one or more user inputs including a user input associated with the second support configuration; and wherein simultaneously operating the first, second, third, and fourth support actuators to move the patient support surface toward the second support configuration occurs in response to determining user engagement with the user input associated with the second support configuration.

* * * * *